United States Patent [19]

Burgess

[11] Patent Number: 5,141,641

[45] Date of Patent: Aug. 25, 1992

[54] FLUID SEPARATION DEVICES

[75] Inventor: Keith E. Burgess, Kennebunk, Me.

[73] Assignee: Techniweave, Inc., Rochester, N.H.

[21] Appl. No.: 686,797

[22] Filed: Apr. 17, 1991

[51] Int. Cl.⁵ .................. B01D 24/02; B01D 29/00
[52] U.S. Cl. ............................... 210/483; 210/488;
210/489; 210/521; 55/321; 55/489
[58] Field of Search .......... 210/483, 488, 489, 493.1,
210/521, 522, 321.75, 321.84, 492; 55/296, 489,
DIG. 30, 320, 321

[56] References Cited

U.S. PATENT DOCUMENTS

| 266,372 | 10/1882 | Krutzsch | 210/483 |
|---|---|---|---|
| 2,225,175 | 5/1941 | Smith | 210/489 |
| 2,416,524 | 2/1947 | House et al. | 210/489 |
| 3,266,223 | 10/1961 | Dresser et al. | 210/493.1 |
| 3,358,427 | 10/1965 | Bub | 210/493.1 |
| 3,370,713 | 2/1968 | Stevens | 210/488 |
| 3,479,803 | 11/1969 | Smith | 210/493.1 |
| 4,158,449 | 6/1979 | Sun et al. | 55/489 |
| 4,634,525 | 1/1987 | Yant | 210/488 |
| 4,832,905 | 5/1989 | Bryan et al. | 210/488 |
| 5,006,265 | 4/1991 | Kar et al. | 55/489 |

FOREIGN PATENT DOCUMENTS

| 476372 | 6/1937 | United Kingdom | 55/489 |
|---|---|---|---|
| 600305 | 4/1948 | United Kingdom | 55/489 |

Primary Examiner—Robert A. Dawson
Assistant Examiner—Ana M. Fortuna
Attorney, Agent, or Firm—William G. Rhines

[57] ABSTRACT

Filters, catalytic converters and the like, for separating particulate matter and/or other constituents from a stream of gas or liquid so arranged that substantially all of the fluid passing through the filter must pass through separation material which permits the passage of the fluid therethrough while separating out and retaining the selected substances. Continuums of material are arranged parallel to each other in planar arrays, with periodic spacings between the continuums in each array. Such arrays are superimposed to form a "laminated" grouping, with each continuum in each array angularly oriented with respect to and in contact with the continuums in each next adjacent array which that continuum crosses. Internal distribution paths for the fluid thereby formed by the spacings between the continuums include passageways which extend laterally within each layer and cross-array or translaminar distribution channels produced by aggregations of intersecting paths of the lateral array channels. Selected translaminar channels are adapted as ingress channels, and others as egress channels. The translaminar channels are either left void, or occupied by separation material, or occupied by blocking material so that flow paths are created via which the fluid exiting the device has to have first passed through separation material. The flow paths may include selected among said ingress and egress channels, and separation material that forms either the contents of cross-array channels or that from which said continuums are formed, or both.

41 Claims, 7 Drawing Sheets

FLUID SEPARATION DEVICES

BACKGROUND OF INVENTION

Various types of structures are useful to disassociate selected substances from moving streams of fluid, gaseous or liquid, by which they are being carried. Filters and catalytic converters are examples of such devices and illustrate some in the wide range of structures and functions comprehended by the broad category into which such devices fall, and toward which the present invention is directed. Within that field, filters, for example, may be used to treat exhaust discharges which come from furnaces, internal combustion engines, or other combustion sources, that contain substances in particulate form, which, if not separated from their associated fluid medium, are discharged into the atmosphere. The offensiveness and harmfulness of this are well known. Such substances may be in the form of liquids and/or solids suspended in a gas (generally classified as "aerosols") or in a liquid, and may be relatively small in size. Although the features of the present invention can be beneficial in many if not all substance separation applications, they can be particularly advantageous when applied to the fields of filters, catalytic converters, odor suppressors, toxic constituent removal devices, and the like.

Typically, such devices are housed in some kind of chamber, which optionally may be a closed container through which the fluid that is to be processed is passed. Having entered a filter element, for example, the fluid stream is caused to pass through filtration medium before exiting the filter, by which solid and/or liquid particles being carried by the fluid are retained. Retention may be by entrapment mechanically by the filtration medium of the particles that are filtered out. In that case, the size of the material filtered out will be a function of the size of the pores or passageways through which the fluid can pass. With some filtrates, processing principles other than mechanical entrapment may be utilized. For example, some aerosols, such as the exhaust from a diesel engine, include comparatively large amounts of fine, particulate matter, liquid as well as solid, in suspension. Such suspended matter tends to stick to surfaces with which it comes into contact. Thus, filters for such applications, in addition or alternatively to mechanical entrapment, may be made capable of retaining desired substances from the fluid stream by providing contact surfaces to which such substances may adhere and by enhancing accessibility of those surfaces to the fluid.

The separation,, of desired substances from very hot fluids, particularly those bearing a proportionally high fraction of fine matter, can also impose limitations on the physical properties of the separation materials. There have also been various attempts to produce suitable devices which may be cleaned for reuse so as to extend their useful life, for example, by combustion of materials they have entrapped. This usually occurs at temperatures which are much higher than those encountered by the device in operation. Constituent materials that are suitable for such thermal environments may be difficult to form and retain in a shape or configuration that renders them capable of performing their desired separation functions. Thus, ceramic materials, while desirable in some circumstances because of their heat and chemical tolerance, present limitations as to how they may be formed into separation bodies. While they are susceptible to being formed into monolithic, solid bodies, they are inherently brittle and otherwise liable to break or deteriorate under physical stresses of the type regularly encountered in use. Other factors, such as the necessity to machine or die form in order to produce desired shapes, add to these objections. Some materials, such as ceramic fibrous yarns or felt-like sheets, are tolerant thermally of the range of temperatures encountered in such applications and are capable of being formed more easily into desired shapes.

Similar limitations also apply with respect to separation devices that are used in other treatments of fluid carrier media. For example, a catalytic converter typically may be exposed to a stream of hot gas or other fluid, as may also devices for deodorizing fluids. Such devices may utilize material, such as activated charcoal, to present chemically active surfaces as means for effectuating the desired separation process. Even though some such applications do not always expose the devices to very high temperatures, high efficiency and volume capability, with assurance that virtually all of the material passing through the device will be effectively treated, are desired characteristics which they have in common with devices of the type hereinbefore described, and therefore they present many of the same problems.

Accordingly, it is an object of this invention to produce fluid treatment devices that are capable of removing desired substances from suspension in fluids, liquid as well as gaseous.

Still another object of this invention is to produce such devices that are tolerant of comparatively high temperatures.

Yet another object of this invention is to produce such devices capable of achieve one or more of the foregoing objectives that may be more easily formed into desired shapes.

A further object of this invention is to produce such devices capable of achieving one or more of the foregoing objectives having a high flow-through volume capability.

Another object of this invention is to produce such devices capable of achieving one or more of the foregoing objectives that exhibit structural stability and durability in a wide variety of environments.

Still another object of this invention is to produce such devices capable of achieving one or more of the foregoing objectives which are susceptible to having retained material removed from it by incineration or other purging means.

STATEMENT OF INVENTION

Desired objectives may be achieved through the practice of this invention, embodiments of which include devices for separating desired substances from fluids, such as liquids and gases. Material which is tolerant of the physical, chemical and thermal environment to which such devices are to be exposed, is formed into separation media in the form of yarn-like structures, elongated strips, or other continuums, characterized in that such fluid may pass through them with the desired substances being disassociated from the fluid and retained, by entrapping, adhering to, reacting with, and/or otherwise segregating such substances from the associated fluid. Other suitably tolerant material is formed into blocking elements that are substantially impervious to the passage of such fluid therethrough.

Such continuums of separation media are arranged into arrays in which the continuums are substantially parallel with each other with spacings between them periodically that form intra-array distribution channels. Optionally, continuums made from other materials including (without limitation) blocking materials may be interspersed between separation continuums in order to achieve such purposes as strengthening the structure, flow control, or the like. Such arrays are superimposed, one upon another, to form laminar devices. The continuums in each array are oriented angularly with respect to those in each other next adjacent array and substantially all of those in each array which therefore cross those in each next adjacent array are in close contact with those that they so cross where they cross. Optionally, in preferred embodiments, the succession of arrays are so oriented that their respective continuums, and therefore their respective intra-array channels as well, are substantially at right angles from one array to the next, and/or are arranged so that the intra-array channels of every other array (i.e., those arrays which are "once removed" from each other, or separated from each other by an intervening array) in the succession of superimposed layers is at least partially "in registration" (i.e., in cross-section taken across the continuums, overlay each other, at least partially). Aggregations of superimposed crossovers of intra-array distribution channels create (vertically oriented, when the intra-array channels are horizontal) cross-array or translaminar distribution channels which form passageways that extend through the successive, adjacent, superimposed layers of arrays. The contents of these cross-array channels are selected from the group consisting of void volume (i.e., unoccupied open space), such separation media, and/or such blocking material. By means of the selection made from among that group as to the contents of those channels, flow paths are created via which substantially all fluid exiting the device is made to have passed through separation media of which the device is constructed. In certain embodiments, the separation material through which the fluid is made to pass is that residing in said cross-array channels, or comprising said continuums, or both.

DESCRIPTION OF DRAWINGS

This invention may be understood from the specification and claims herein set forth, and from the accompanying drawings in which

DESCRIPTION OF PREFERRED EMBODIMENTS

Figure 1:
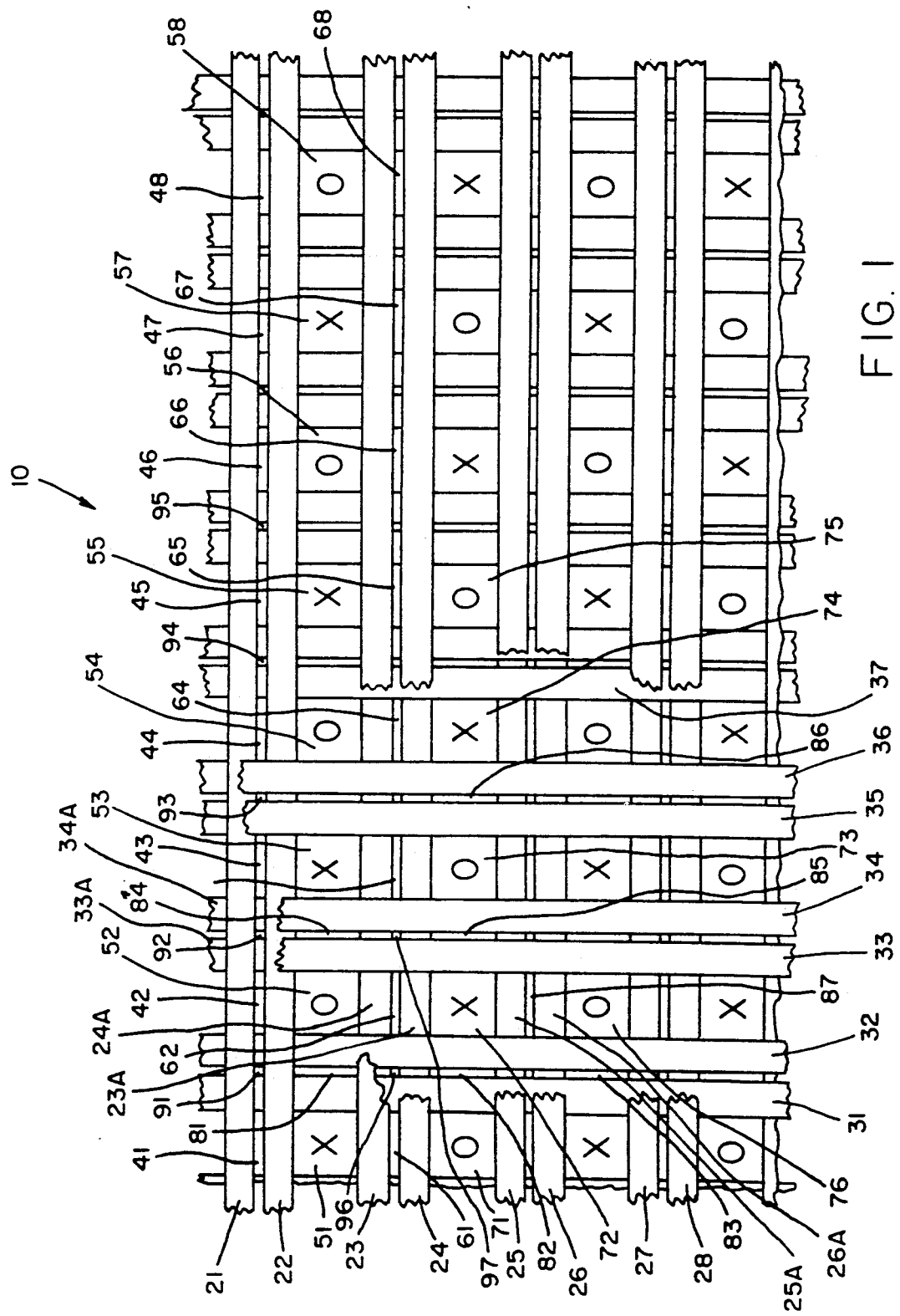
FIG. 1 is a plan view of one embodiment of this invention

Although some of the descriptions herein presented of embodiments of this invention will be in terms of their being for the purpose of filtration, it is to be understood that this invention may be practiced in a wide variety of other applications as well. These also include, (without limitation) catalytic converters, odor suppressors, toxic removal devices, and the like, as well as other structures to separate selected substances from a fluid carrier, such as a liquid and/or a gas, by which those substances are being borne. The material from which such devices may be constructed will, of course, be appropriate, physically, chemically, thermally, and in other pertinent aspects, to the intended application for the device. Thus, for example, in certain applications, fibrous, yarn-like structures may be the form, and ceramic fibers the material, best suited for the separation media as described. However, other forms such as strips, and other materials such as platinum or activated charcoal, may be appropriate where phenomena such as adsorption, surface reactions, or other phenomena are to be utilized as a means to separate substances as desired from such a fluid, as in the case of catalytic converters, toxic gas treatment devices, and odor suppressors. Combinations of materials may also be used, such as coated yarns or the like, as means to introduce desired materials which are reactive, adsorptive or otherwise suited to such processes in the resulting structure is to be used. In that connection, it is to be understood that the term "substance(s)" in this context of their separation, removal or disassociation from fluid by which they are being borne is to be construed in the broad sense of any substance being borne by the fluid as well as any constituent of the fluid itself, whether or not in the form of a separate and distinct physical entity. Thus, although particles and droplets are included, as are other forms of solids and liquids, so also are constituents of the fluid itself. A toxic gas constituent of a gaseous fluid is an example of a "substance" within this meaning even though, for example, it may not be in a form which is separately identifiable visually. Thus, within the contemplation of this invention, the "separation", "removal" or "disassociation" of a "substance" is intended to mean by whatever means, physical, chemically reactive or neutralizing, or otherwise, any constituent of the fluid being treated including (without limitation) any which is a chemically combined constituent of that fluid as well as any being transported by it, may be segregated from the fluid itself.

Within the contemplation of this invention, the actual separation of substances from the fluid to be treated is achieved by the use of materials which, like the other constituent material of relevant parts of embodiments of this invention, are acceptably stable against the physical, chemical, thermal, and other relevant characteristics of the environment in which the device is to operate, and of the fluids and matter to which they will be exposed. Other criteria may as well be relevant to the selection of such material, such as physical characteristics which enable the separation media to be formed into and retained in desired shapes, sufficient permeability to the fluids to which it is to be exposed to enable the fluid to pass through the separation media at desired rates while separating desired substances from the fluid as it passes, etc., all as will be apparent to those skilled in the cognizant arts.

Structures according to this invention may be so structured and/or positioned in a housing, or otherwise situated, as to provide desired strength, protection, and structural integrity in the intended context. For example, a metal, can-like container may be used, although the use of such structures and/or containment housings or their exact nature or design are not necessary or critical to the practice of this invention.

Figure 2:
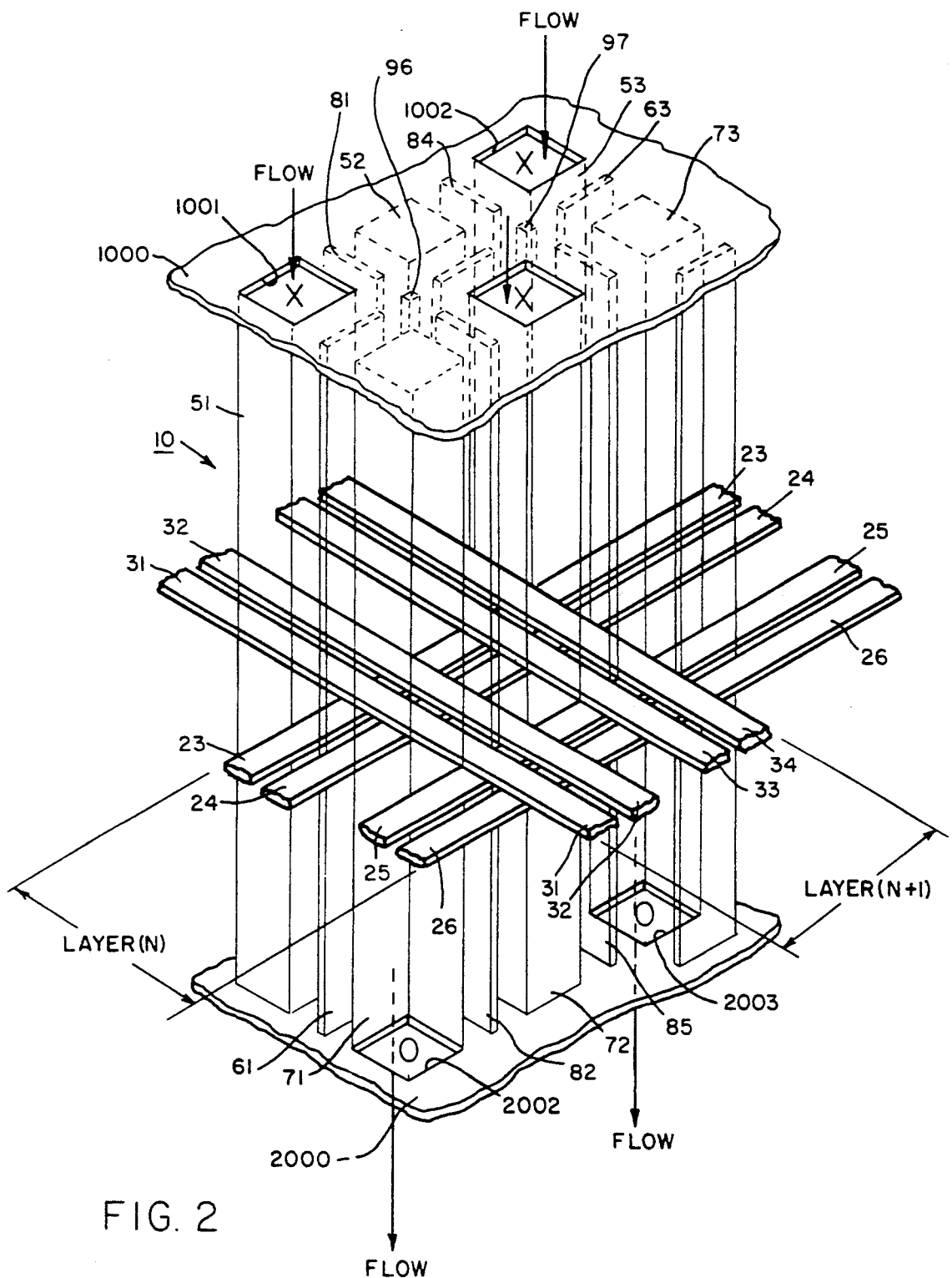
FIG. 2 is a perspective view of the embodiment of this invention shown in FIG. 1.
Figure 3:
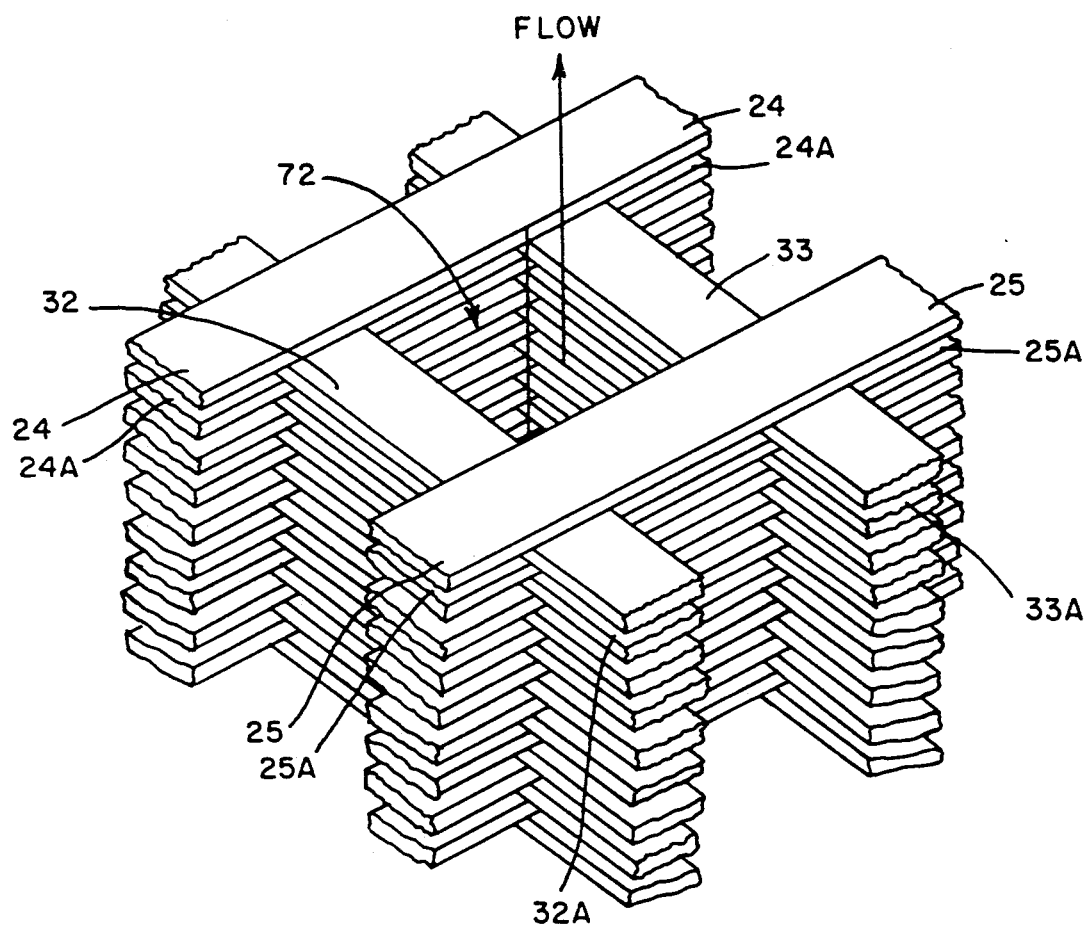
FIG. 3 is an enlarged perspective view of a portion of the embodiment of this invention shown in FIGS. 1, 2 and 2A.

FIG. 1 depicts an embodiment of this invention in schematic plan view showing a representative portion of a filter structure 10 from the top. As in other of the accompanying Figures, certain of the translaminar passageways hereinafter more fully described are selected and adapted for use as paths of ingress for fluid into the device and these are designated with an "X". Others among them are selected and adapted for use as egress passageways and are designated "0". Thus, in the embodiment shown in FIG. 1, fluid to be treated is introduced into the device via selected among the translaminar or cross-array passageways 51, 53, 55...74. Correspondingly, treated fluid is removed from the device via selected among the other translaminar passageways 52, 54, 56...75 after selected substances, such as particles of matter, have been separated from the fluid as desired. As shown in FIGS. 1 through 3, the ends of these translaminar passageways are shown in cross-section as a checkerboard of as parallel channels in which ingress ("X") channels (51, 53, 55 . . . 74 . . . etc.) alternate with the egress ("0") channels (52, 54, 56 . . . 75 . . . etc.).

As is the case with any of the translaminar channels in embodiments of this invention, the flow of fluid may be restricted or prevented by any among a variety of means. One such means is to introduce blocking material (i.e., material through which the fluid may not pass) into them. This may be done at one or both ends, and/or for their entire length, and/or through part of their length, and/or intermittently. It may also be done so as to create superimposed units, at the interfaces of which intra-array channels may be provided by which fluid may be shunted between translaminar channels in successive such units where the ends of the channels that are not aligned from one unit to the next. One means to effectuate these results that is particularly useful in connection with establishing separate ingress and egress channels is illustrated in greater detail in FIG. 2. This shows the use of plates at each end of the channels with holes positioned selectively to block one end of some channels and to leave others open in order to create desired patterns of ingress into and egress from the device. As shown in exploded view in FIG. 2, end plates 1000 and 2000 cover, respectively, the inlet (source) and egress (exit) ends of the device 10. The inlet plate 1000 has a series of holes or apertures 1001, 1002, 1003...etc., each of which is aligned with one end of one of the inlet channels 51, 53, 72...etc. respectively, through which untreated fluid enters the device from tubes or other exterior sources (not shown). The plate 1000 also blocks the corresponding ends of other among the channels (e.g., 52, 71, 73...etc.). Similarly, the end plate 2000 at the opposite (exit) end of the device also includes a series of holes 2001, 2002, 2003...etc., each of which is aligned with the opposite end of translaminar egress channels 52, 71, 73...etc. which, in turn, interconnect with tubes or other means (not shown) to carry treated fluid away from the device. As shown, these are the same channels whose opposite ends are blocked by the plate 1000. Correspondingly, the channels 51, 53, 72...etc. to which the apertures or holes 1001, 1002...etc. in the plate 1000 provide access, are blocked at the opposite end by the unapertured portions of the plate 2000. Although in this Figure, separate plates are shown, of course comparable results may be achieved using other structures, such as the end caps of container housings, etc.

Referring again to the embodiment of this invention shown in FIGS. 1 through 3, constituent material which observes the aforesaid criteria has been used to create separation (in this case, filtration) media in the form of elongated continuums which are oriented substantially parallel to each other in each of a succession of superimposed arrays which, in turn, are substantially parallel to each other. Although only two such arrays are illustrated in FIGS. 2 and 4 through 6, it is to be understood that it is within the contemplation of this invention that normally more such arrays, sometimes to a substantial number, will be superimposed, one upon another, to create complete devices. This is illustrated by the portions of the third array layer shown in FIGS. 1 and 2A, demonstrating that this third array is substantially a replication of the first or topmost array, in the form of continuums 23A, 24A, 25A, 26A . . . etc., 33A, 34A . . . etc.. Obviously, just as the third layer replicates the first, so also will a fifth, seventh, etc. and a fourth will replicate the second as also will a sixth, eighth, etc.. This is also shown in even greater extent in the multiple underlayers (un-numbered) shown in FIG. 3. Thus, this succession of replications as between every other superimposed array is carried out seriatim from top to bottom throughout the device. Therefore, the separation continuums in each array will be seen to be parallel also to those in each other array in the superimposed stack from which that array is "once removed" (i.e., with respect to which, another array is interposed). So also will be the intra-array channels of each such array be parallel to every other array once removed.

A further consideration to be addressed is the extent to which such intra-array channels in any given array are "in registration" with those in the arrays once removed from it. The term "in registration" in this context is intended to mean that viewing in cross-section the channels in arrays that are once removed from each other, that channels of one of those arrays superimpose or overlap the correspondingly located channels in the other of said arrays. Thus, for example, in FIG. 1, the intra-array channel between continuums 33, 34 overlay or overlay that intra-array channel formed by the space between continuums 33A, 34A. In that particular example, such corresponding intra-array channels substantially entirely overlap. While it is conceivable that embodiments of this invention may be made in which that relationship is not regularized throughout the resulting structure, in certain embodiments such channels are at least partially and desirably substantially entirely in such registration since, as will be seen from the description which follows, since the effect of that is to create less tortuous flow paths by which fluid may be transported through the device. Thus, when substantially entirely in registration, virtually straight translaminar paths are created that are substantially at right angles to the planes of the constituent arrays.

It is also to be understood that optionally in this embodiment as well as other embodiments of this invention, continuums made from materials other than separation media may be interspersed within the contemplation of this invention. Thus, blocking materials may be used in such interspersed continuums for purposes of flow control, and/or strength materials may form such interspersed continuums in order to impart desired physical properties, such as strength and shape stability, to a device. Advantageously, the arrays may be substantially planar and flat, but other configurations which observe these teachings are also within the contemplation of this invention.

Embodiments of this invention having separation media made from ceramic yarns or the like are particularly adapted for use as filters for hot gases, such as the exhaust from diesel and other internal combustion engines. This is because of the ability of such materials to withstand the associated heat and to be so engineered as to remove a large amount of particulate material with high efficiency. However, other yarns might also or alternatively be used.

In this context, it is to be understood that the term "continuum" is to be construed to mean any elongated form of material, including (without limitation) any formed per se as a yarn, string, thread, or the like, as well as any, such as a strip of material, cut or otherwise formed from material which was in some other form, such as felt, paper or other sheet-like structures. "Yarn" is to be construed in its broadest sense as comprehending any textile-like or other continuum, regardless of whether twisted, cabled, or otherwise conforming to traditional concepts of what constitutes a "yarn". Therefore, this includes twisted or loosely bunched fibers, or parallel or twisted monofilaments, or cabled structures, etc. "Separation media" or "separation material" is intended to include any materials which exhibit the characteristics of being permeable to fluids, whether liquid or gaseous or some combination of both, whether the direction of such permeability is transverse or axial or both with respect to the long axis of the continuum, and of having the ability to disassociate substances from such fluids as those fluid pass through them by any process whatsoever including (without limitation) entrapment, chemical action or reaction, adhesion, absorption, and adsorption. "Blocking materials" are meant to include any materials that are substantially impervious to the passage of fluid therethrough. "Filtration media" or "filtration material" is intended to include separation material or "separation media" that is adapted to separate selected substances from fluids by any process normally used to achieve filtration, such as entrapment and/or adhesion.

Figure 2A:
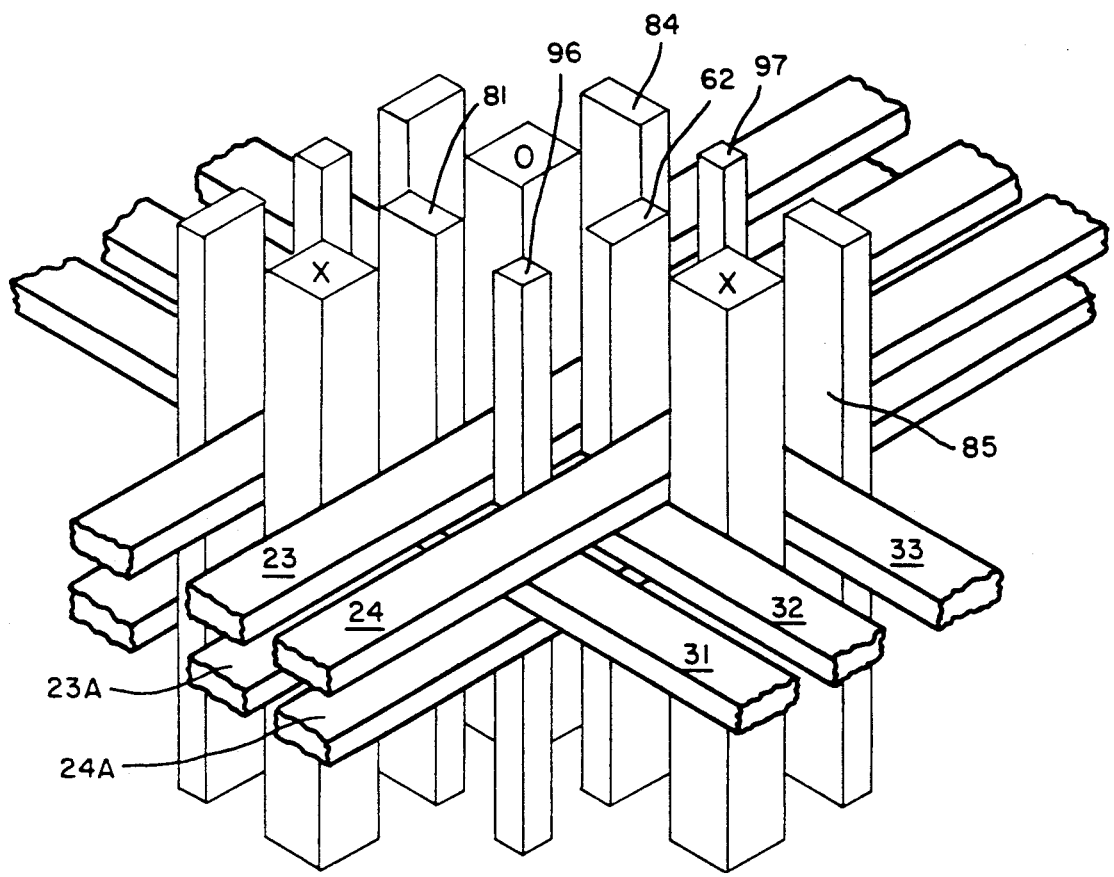
FIG. 2A is an enlarged view of a portion of the embodiment of this invention shown in FIGS. 1 and 2.

It should be noted that in the particular embodiment shown in the accompanying FIGS. 1 through 2A, the arrays of continuums have been oriented into closely spaced apart pairs. Thus, yarns 21 and 22 form one such closely spaced pair, for example, as do also yarns 23 and 24, and yarns 25 and 26, and yarns 27 and 28 etc. These are shown as being oriented parallel to each other in a horizontal plane in a first direction in FIG. 1. Similarly, another array of such pairs 31,32; 33,34; 35,36; . . .etc. form the next adjacent, underlying array is also shown in that Figure. Its constituent continuums are parallel to each other in a second horizontal plane in a second vertical direction; i.e., with its continuums crossing those of the first array at an angle. In this case, that angle is approximately 90 degrees. This sequence of continuum orientation is repeated seriatim throughout successive additional arrays which are superimposed one upon another. Thus, the third such array (23A and 24A, 25A and 26A . . .etc.) underlies the second one and is also in contact with it, with its continuums substantially parallel to those of the first, or topmost array. The fourth array (33A and 34A . . .etc. has the same abutting relationship to the third as does the third to the second, and the continuums of the fourth have the same parallel relationship to those of the second as do those of the third to those of the first array. This alternating pattern of relationships is repeated throughout the height of the device. As previously noted, when these arrays are viewed in cross-section taken through their respective constituent continuums, the intra-array spacings between the constituent continuums of the each array (e.g., the third) are at least partially (and in many instances, totally) in registration with (i.e., are overlayed by) those once removed from it (e.g., the first). This arrangement is also continued seriatim throughout the layers of arrays comprising the device so that such partial or total registration, as the case may be, obtains as between each constituent array and every other array that is once removed from it. Each continuum in each such array is in close contact with substantially all of the continuums in each next adjacent array that it crosses at the point at which each such crossover occurs. As will be apparent from the explanation which follows, the small, linear intra-array channels so formed by such close spaces between the continuums forming each of the pairs within each array (e.g., the channel between continuums 33, 34) become avenues for the distribution of fluid laterally within that array along the length of each such channel. It should also be noted that in this embodiment, each pair of continuums is separated from each pair next adjacent to it by another, wider, continuous open space (e.g., continuum 32 vis-a-vis continuum 34). These latter spaces also provide another multiplicity of parallel intra-array distribution channels within each array. As will be elaborated later, these intra-array channels, whether between single continuums or between groups of continuums, provide paths for the distribution of fluid within the individual arrays throughout the device and enlarge the surface area presented to the untreated fluid, thus in certain applications, enhancing the separation process. Thus, according to the teachings of this invention, separation devices are created in which the superimposed arrays collectively create a kind of laminated structure in which the yarns or other continuums of each layer are oriented at an angle with respect to those in each next adjacent array, and in which the continuums of each array are in close contact at their points of crossover with those which they cross in each next adjacent array where the continuums of each cross those of each next adjacent array. To illustrate these inter-layer relationships, in FIGS. 1 through 2A, one layer is shown and designated as "Layer 'N'", while a layer next adjacent to it is shown and designated as "Layer 'N+1'", with the yarns of the former oriented substantially at right angles to those of the latter. The desirability of that particular 90 degree angular disposition, although not essential, will be apparent from what follows.

In the previous discussion, it has effectively been noted that because of the angular orientation of the continuums in each array relative to those in each next adjacent array, the intra-array distribution passageways formed both between the continuums forming each pair and between each pair or other multiple grouping of continuums in any given array are also oriented at the same angle with respect to those in each such next adjacent array as are their respective constituent continuums. Thus, in the same way as do the continuums in successive adjoining arrays, channels or passageways in each array also periodically cross over such channels in next adjacent array. By aligning the intra-array channels in any given array so that its channels are parallel to and are at least partially in registration with the corresponding channels in each other array in that stack that is once removed from it, all as has been previously discussed, aggregations of successive superimposed channel crossovers collectively form other channels which are oriented across the planes of the arrays constituting that stack. These are designated herein, from their orientation, as "translaminar" or "cross-array" channels. Such registrations of channels as well as the 90 degree orientation of continuums are channels are preferred arrangements in the interests of making flow paths which are less tortuous, but other arrangement are also within the contemplation of this invention.

In the embodiment as shown in FIGS. 1, 2, and 2A, three distinct sets of such translaminar channels are thereby formed:

(1) those generated by such aggregations of crossovers of the relatively wide intra-array channels that are between pairs of such continuums in one array with corresponding wide channels in other arrays (e.g., 51, 52, 53 . . .75 . . .etc.);

(2) those generated by such aggregations of crossovers of the relatively wide intra-array channels that are between pairs of such continuums with the relatively narrow intra-array channels that are between the constituent continuums of each pair of continuums (e.g., 41, 42, 43 . . .68 . . .etc., 81, 82, 83 . . .86 . . .etc.), and;

(3) those generated by aggregations of crossovers of the relatively narrow intra-array channels that are between the constituent continuums of each pair in one array with corresponding wide channels in other arrays (e.g., 91, 92, 93 . . .96 . . .etc.

The cross-array channels thereby created may selectively be occupied by "void volume" (i.e., left unoccupied), and/or by filtration or other separation media (i.e., that which is transmissive of the associated fluid, with the ability to retain selected substances that have been disassociated from the fluid being processed). They may also or alternatively be occupied by "blocking" materials (i.e., those which are substantially impervious to the passage of fluid therethrough). Such "blocking" materials, when used, are selected to have physical, chemical, thermal and other properties that are tolerant of the environmental conditions to which they will be exposed and also to be compatible with the separation material. If, for design reasons, such as overall separation capability or capacity previous material occupies any of these locations, it may be of the same permeability, or more or less permeable than are the separation continuums. As is shown, whichever among these three choices is selected to occupy these channels, whether it be void volume, separation material or blocking material, it will made to assume elongated shapes which extend through the layers of arrays which comprise the device. In this illustration, their direction is substantially at right angles to the planes of the arrays because the intra-array channels in alternating layers of arrays are so positioned as to align with each other along lines which are substantially at right angles to the layers; i.e., with their corresponding continuums at right angles from layer to layer, and with their intra-array channels in alternating arrays substantially "in registration". It will be apparent from these teachings that although such channels may extend vertically for substantially the entire height of the device, or this segment of a compound stack if that is the configuration involved, design considerations may indicate the desirability of some or all of these translaminar channels being shorter, and of any given translaminar channel being occupied along selected portions of its length by various combinations of blocking and/or separation materials, and/or void volume, and that such accommodations are within the contemplation of this invention.

The selection of what is to occupy each of these translaminar channels (i.e., void-volume, separation media, and/or blocking material), the extent to which each of them is are so occupied by one or more selections of contents from among the listed options, and the location within them of such selections, is such that, in any event, substantially all fluid exiting the device via selected among said translaminar channels will gave to have passed through separation media at some location. Although, as will be apparent from the descriptions which follow, such separation media may be in other portions of the structure of such devices, in many instances it will that which occupies the translaminar channels, or that from which continuums have been made, or both.

As is shown in greater detail in FIG. 2 and 2A, in this particular embodiment, the distance between the two continuums forming each pair is less than the distance by which each pair is separated from each pair next adjacent to it in the same array. Therefore, in situation "(2)" above (i.e., where a wider channel between a yarn pair crosses over a narrower channel between a pair of yarns), the cross-sectional dimensions of channel produced by the crossover, and therefore of whatever among the selections occupies it, are shown as being greater in one direction than in the other. Thereby the contents of these channels which extend across the multiplicity of superimposed arrays occupy the entire cross-section of such channel. Of course, in that same situation "(2)", if the dimensions of the spaces between the continuums forming each pair were substantially the same as that between each pair of continiums, the cross-sectional shape described by them where they cross over and also of the contents of the translaminar channel thereby generated will be substantially that of a square. (That feature is shown in the embodiment illustrated in FIG. 4).

By selecting whether separation material or blocking material or void volume is to occupy each translaminar channel, the flow of fluid through the translaminar passageways may be so regulated that the flow path of substantially all fluid passing through the device must pass through and be treated by separation media before it can exit the device, some or all of which is located in such channels and/or forms constituent continuums of the device or both.

In the interests of adjusting the volume of flow of fluid through the device, for example, or of varying the efficiency with which selected substances are separated from the fluid, or of satisfying other operational objectives, it may be desired to vary the selections as to the contents of the various translaminar channels. One such option is to utilize the continuums themselves as the separation media. In that case contents of these same "situation (2)" translaminar channels may be selected to be blocking material. The effect of blocking material being the contents of channels 62, 83, 85, 87, for example, will be to prevent fluid which is traveling into the device via ingress channel 72 from being able to cross directly to any of the immediately available translaminar egress channels 52, 71, 73, 76 without having first passed through separation material forming at least one of the continuums by which the latter four channels are separated from channel 72. However, the use instead of separation material in some or all of those same channels 62, 83, 84, 87 can be made to achieve the same result of all fluid having to pass through separation material before exiting the device, but by different amounts. A factor in achieving these results is that the continuums of one array are in close contact with those in each next adjacent array that they cross where they cross. In the second situation just described, any fluid seeking to exit from a translaminar ingress channel must do so either by traveling transversely through a continuum made from separation material, or by traveling through separation material occupying the "situation (2)", crossover generated, translaminar passageways. On the other hand, in the situation first described (i.e., where the channel containing blocking material, fluid is blocked from passing directly from an ingress to an egress channel via the spaces between pairs of yarns (e.g., between yarns 24, 25) in yarn arrays that are once removed from each other (e.g., "Layer N"), and the layer (not shown) which is next above "Layer N+1" in FIGS. 1, 2 and 2A) that are produced by spaces between the pairs of yarns (e.g., 32, 33) in the yarn array which intervenes between them (e.g., "Layer N+1"). Thus, fluid passing through the device is forced to pass through separation material in either case.

This is not to say that all space overlays other than the ingress and egress translaminar channels must be occupied by either separation material or blocking material for embodiments according to this invention to work. As will be apparent from FIGS. 1, 2 and 2A, in the embodiment therein depicted, "situation (3)" translaminar channels 91, 92, 93...95...etc. are created by the overlay of spaces between pairs of continuums in adjacent arrays and also extend vertically ("translaminar" or "cross-array") through the device. They are not occupied by either separation or blocking materials, but instead by void volume or open space. For example, the overlay of the intra-pair space between continuums 21 and 22 with the intra-pair space between continuums 31 and 32 will be seen to form part of the length of the square, translaminar channel 91. Such channels, and others similarly created, are depicted in FIG. 1 as 91, 92, 93...95...etc. From the description of FIG. 4 which follows, it will be understood that such void-volume channels may, in some cases, satisfactorily be incorporated into embodiments that are within the contemplation of this invention. Suffice it to say here that the reason such channels do not necessarily have to be occupied by separation media or blocking materials as do other translaminar channels as hereinbefore discussed is that they may be blocked periodically and/or at each end, and/or otherwise rendered so as not to present an opportunity for fluid to pass via them through operation of pressure differentials or the like. In other words, they are not permitted to become part of any significant flow path. Thus, as is shown in FIG. 1, 2 and 2A, and as will be shown with respect to FIG. 4, it is possible according to the teachings of this invention, for translaminar or cross-array channels to contain only void space even though they are not being utilized primarily for ingress or egress purposes.

These examples are also illustrative of considerations typically involved in selecting which contents of the translaminar channels are appropriate, and of how, by means of such selections, design parameters such as volume capability, efficiency, longevity and other relevant characteristics of separation devices may be varied widely to achieve a broad range of performance characteristics through practice of this invention.

FIG. 2 provides a perspective view of the embodiment of this invention illustrated in FIG. 1. To further illustrate now this embodiment functions in use, one segment will be described in detail, with the understanding that comparable effects will occur in other portions of the structure as well. To do so, a travel path for fluid being treated will be described as it proceeds through the structure as shown. Such untreated fluid, whether liquid or gas, is introduced into and passes along one of the cross-array distribution channels 72 which is unoccupied by separation or blocking material and provides ingress into the filter element 10. A portion of the fluid, upon reaching that part of the wall of the channel 72 described by the outside of separation continuum 32, attempts to move along the path of least resistance toward an outlet passageway in the vicinity (e.g., 52, 71, 73). The relationship of the separation continuums which surround, provide the walls of, and define the cross-array distribution channel 72 are shown as well in FIG. 3. In a filtration device, for example, these continuums might be in the form of ceramic fiber yarns. Viewing FIGS. 1 and 2, it will be seen that no matter which travel path the fluid follows as it leaves the channel 72, it cannot arrive in one or more of the cross-array distribution channels (e.g., 52, 71, 73, etc.) which, in this embodiment, are also unoccupied and provide egress for the fluid from the device 10, without having first passed transversely through at least one of the separation continuums (e.g., 32, 33, 24, 25, etc.). Every other path of travel, as along the intra-array distribution passageways provided by the space between the yarns of each pair, or along those provided by the wider distribution channels formed by the space between pairs of yarns, is interrupted either by "blocking" material (e.g., 61, 62, 63...etc., 81, 82...85...etc.) or is substantially blocked by the close contact between each of the continuums of each array and those in each next adjacent array over which it crosses where they cross. In some embodiments, such as this one, blocking materials may be used to achieve the desired control of the flow of fluid through the device. However, in some cases, the material occupying the spaces here described as containing blocking material may, instead, contain separation media and thus may serve a separating function as well. As such, that separation media may be less or even more permeable than are the separation continuums. Of course, if the blocking material in one or more of these locations is replaced by separation material of whatever degree of permeability, the end result will be the same: fluid will have been made always to have passed through separation material at some point in order for the fluid to complete its passage through and to exit the filter. Filtration of all of the fluid being processed by the filter is thereby assured.

As has been noted, in addition to any separation media that may be positioned in the passageways, at least some of the walls of these passageways effectively may also be formed from separation media, so that to the extent that the walls themselves are traversed by particle-bearing fluid, further separation takes place. But it should also be noted that the distribution passageways and cross-array distribution channels themselves can effectively provide long, tube-like passageways along which passes the fluid to be treated, and that they, too, may be utilized for separating purposes.

The process of the effective separation of selected substances in the form of particles from a fluid may include mechanical entrapment of particles by the utilization of fluid passage holes which are smaller than the physical dimensions of the particles to be removed from the fluid. This is a usual process employed in filtration. The removal of certain substances from a fluid may also, and/or alternatively involve adhesion to and/or adsorption and/or other surface reaction phenomena by the separation surface as the fluid medium passes by it. In those cases, the advantage of providing long passageways for the fluids will be apparent. These features may be applied in embodiments of this invention as herein described, particularly when treating fluids which have substances that are susceptible to being separated from it by a phenomenon of surface action as previously described. For example, the channels and passageway walls themselves may provide additional removal capability with attendant lower pressure drop than when separation media is being traversed by the fluid, particularly when the separation medium is fibrous, as when in the form of staple yarns which present loose fiber ends to the stream of fluid moving past. Thus, while no theory is here asserted with respect to the present invention, suffice it to say that through various of these approaches, embodiments of this invention may be made that exhibit superior results.

Figure 4:
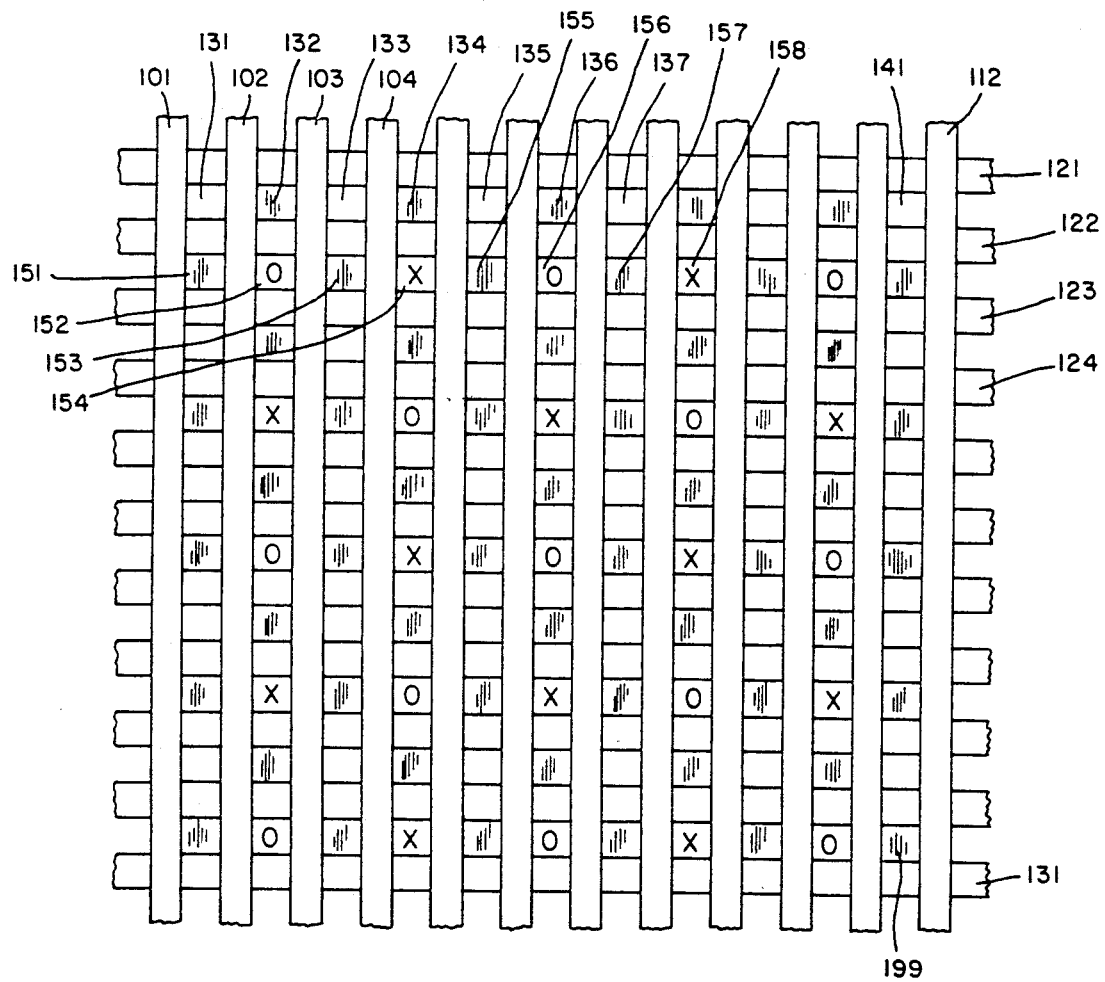
FIG. 4 is a plan view of another embodiment of this invention.
Figure 5:
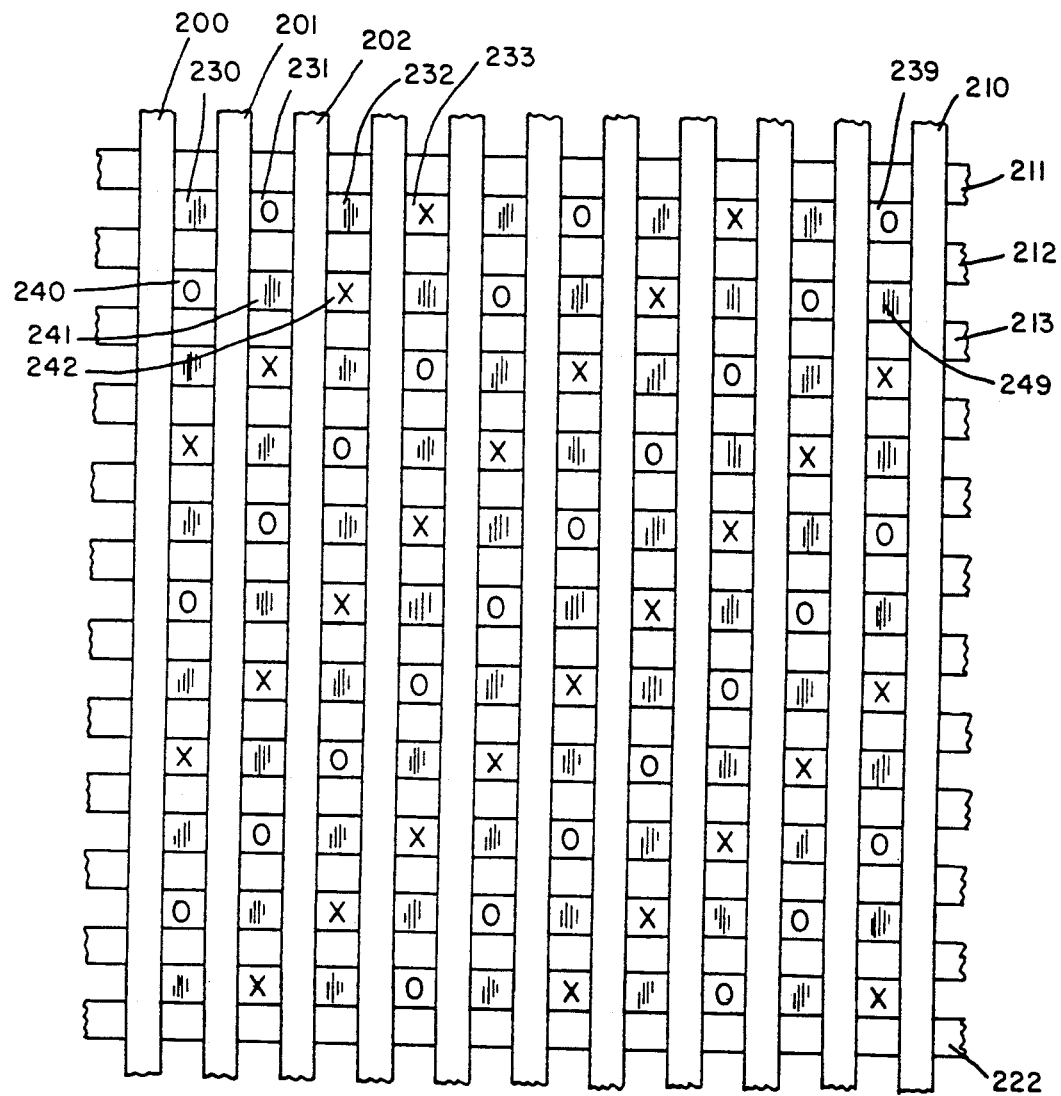
FIG. 5 is a plan view of still another embodiment of this invention.

FIG. 4 illustrates, in plan view, two overlayed arrays in another embodiment of this invention wherein there is not a pairing of continuums but, instead, substantially parallel arrays of single spaced-apart yarns 101, 102, 103 ...112...etc. in one direction, overlaying, substantially at right angles, another array of spaced-apart single yarns 121, 122, 123,...131...etc. This will demonstrate that the paired continuums concept embodied in the devices as shown in FIGS. 1 through 3 is optional, and that other configurations are within the contemplation of this invention as well. Indeed, the embodiment illustrated in FIG. 4 may be described as a modification of that shown in FIGS. 1, 2 and 2A, with the space between the yarns widened to equal that between the pairs of yarns. Of course, the arrays shown in FIG. 4 are but two of a multiplicity of arrays which are superimposed, one upon the other, to form a separation device of any of the types herein described. Since the constituent yarns of each array (and every other array over or under which each array is positioned) are spaced apart, when the crossovers of these spaces are at least partially in registration with those in each other array once removed, a plan view "checkerboard" of cross-array or translaminar channels 131, 132, 133 ...199...etc. as shown in FIG. 4 is created. In the first row of such channels, every other channel 131, 133, 135 ...etc. contains void volume; i.e., is unoccupied. The intervening channels in that same row 132, 134, 136...etc. are occupied by separation material. The next parallel adjacent row has every other one among such channels (i.e., 151, 153, 155...etc.) occupied by separation media and offset with respect to the channels of the first row which contain separation material. In that same second row, those channels not occupied by separation material (i.e., 152, 156...etc.) are occupied by void volume (i.e., are unoccupied) and are utilized as egress channels. The remaining channels in that row that are not occupied by separation material (i.e, 154, 158...etc.) are also occupied by void volume (i.e., are unoccupied) and are utilized as ingress channels. That sequence is repeated seriatim from row to row throughout the rows of the FIG. 4 embodiment as shown. It will be apparent from this Figure that again, since all continuums in successive arrays which cross are in close contact with each other at their place of crossing, the only available flow paths along which fluid may travel from an ingress channel to an egress channel include separation material through which the fluid must pass; whether that material forms part of one or more continuums, or occupies one of the translaminar channels, or both. Further, the unoccupied channels which are not utilized either for ingress or egress, may be effectively deactivated, as by blocking them at their ends. In that respect, then, they are analogous to the "situation 3" channels hereinbefore described with respect to FIGS. 1, 2 and 2A, in which such channels are illustrated and designated as channels 91, 92, 93...97...etc.

FIG. 5 illustrates, again in cross-sectional plan view, another embodiment of this invention. It will be apparent that this embodiment has elements which correspond to those discussed in connection with FIG. 4: i.e., an array of parallel spaced continuums 200, 201, 202.. .etc., and a second array of such continuums 211, 212, 213...etc. with its continuums oriented at an angle to and in close contact with ,those of the first. The tranrslaminar channels thereby formed are variously selected for ingress (marked "X") and egress (marked "O"), and for occupancy by separation media (e.g., 230, 232...241...etc.). In this embodiment, however, no translaminar channels other than those utilized as ingress and egress channels are occupied by void volume (i.e., are left unoccupied). In that respect, this embodiment can be said to be analogous to the embodiment of FIG. 4 except that there are no unoccupied translaminar channels other than those being utilized as ingress or egress channels. As in the other embodiments of this invention, any fluid entering the device via an ingress channel must pass through separation material before being able to exit the device via an egress channel thus again ensuring separation treatment of substantially all fluid being processed through the device.

Figure 6:
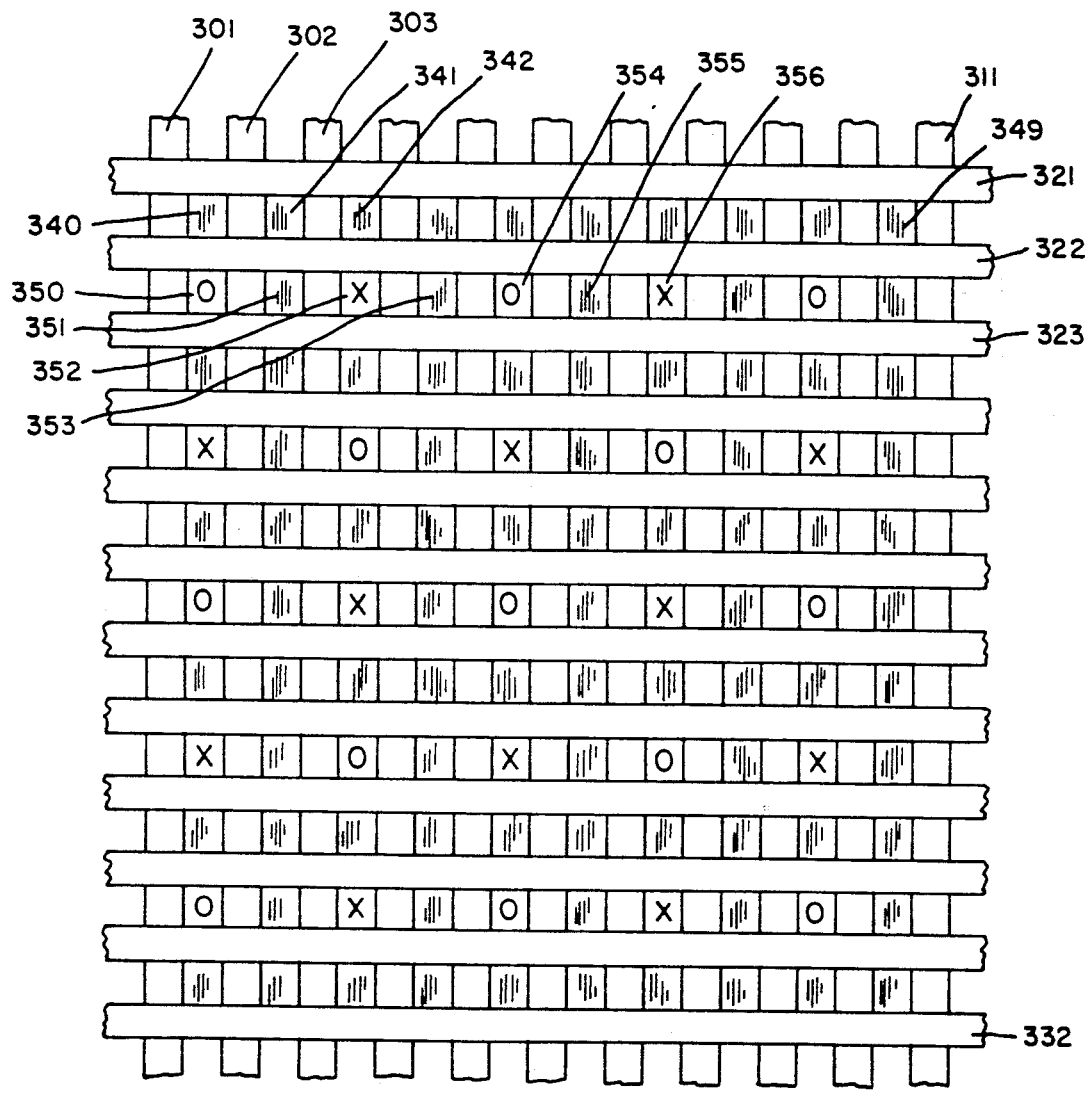
FIG. 6 is a plan view of yet another embodiment of this invention.

FIG. 6 illustrates, in cross-sectional plan view, yet another embodiment of this invention. As with the embodiment shown in FIG. 5, arrays of parallel, periodically spaced yarns 301, 302, 303...311...etc. are overlayed in crossing, close contact relationship, with other such arrays 321, 322, 323...332...etc. In this embodiment, however, every other translaminar channel (e g., 340, 341, 342...349...etc.) is occupied only by separation material. Those rows are interspersed with rows in which every other translaminar channel (e.g., 351, 353, 355...etc.) is also occupied by separation media, while the intervening such channels contain void volume (i.e., are unoccupied) and are alternatively utilized as ingress (e.g., 352, 356...etc.) and egress (e.g., 350, 354...etc.) channels. Thus, this embodiment may be said to be like that shown in FIG. 4 except that the translaminar channels that have been adapted for use as ingress and egress channels are occupied by separation media and so are caused to perform a separation function as well. This again demonstrates the wide variety of configurations which embodiments of this invention can take and maintain the feature that by selection of the contents of the translaminar channels, fluid passing through them is made to have to pass through separation media before exiting.

As has previously been noted, certain of the translaminar arrays are selected to serve as ingress ("X")

channels to supply untreated fluid into devices according to this invention, while others are selected to serve as egress ("0") channels for the treated fluid. In connection with the discussion relating to the embodiment shown in FIG. 2, apertured end plates 1000, 2000 are shown as blocking means to be used in this connection. However, other means may also, or in the alternative, serve to adapt such channels to these purposes. One such advantageous alternative may be visualized from FIG. 6. For example, the separation material which forms the contents of channel 351, instead of being terminated at the level of the continuums 322, 323, may be made to extend in the "valley" between continuums 322, 323 across the ingress ("X") channel 352 and then go back into the channel 353. After extending the length of the channel 353, it may then be made to emerge from the opposite end of the device and then extend there across the far end of channel 354 and then into channel 356, along which it extends back to the end of the device depicted in FIG. 6; then along the continuum 322,323 "valley", across ingress ("X") channel 356 to the back side of the device, and so forth, back and forth along each row. This has the effect of forming a kind of "stitching" weave, by means of which the selected ingress and egress channels are effectively adapted to their intended uses. While they may thereby form end blocks of the same end of the ingress channels, and end blocks at the opposite end of the egress channels, to whatever extent the separation material covering such channel ends might permit fluid to pass, the ultimate objective will still have been satisfied of causing all fluid which traverses the device to have been passed through separation material. Such an arrangement therefore can be utilized to provide separation material as an integral part of the structure of the device which not only serves to adapt selected among the translaminar channels for use as ingress and/or egress channels, but also provides some or all of the separation material through which fluid traversing the device is made to pass. It will be clear, then, that adapting selected among the translaminar channels to serve as ingress and egress channels can be achieved by a variety of means, and, combined with the selection made of the contents of patterns of translaminar channels, can be made to become an integral part in achieving the ultimate objective of all fluid traversing the device having to pass through separation material at some location.

It will be seen, then, that by the use of continuums made from separation media oriented spaced apart periodically and parallel to each other into overlayed arrays in which the continuums in each array are at an angle with respect to those in each next adjacent array and in which each continuum is in close contact with each continuum in each other array that it crosses where it crosses, and by selecting the contents of the cross-array channels thereby generated by aggregations of cross-overs of intra-array channels from among the group consisting of void volume, separation material and blocking material, embodiments may be made of this invention in a wide variety in which, as a result of the selections made, the only way fluid may exit is via flow paths in which the fluid has to pass at some point through separation media. In preferred embodiments, the continuums of successive arrays are created at right angles to each other and/or the intra-array channels of arrays whose constituent continuums are parallel between such arrays are at least partially in registration. It should also be understood that the principles herein disclosed are applicable to liquid as well as gaseous fluid media, and are susceptible to modification according to accepted engineering practices. For example, the preceding discussion has been directed toward structures contemplated by this invention, regardless of the exact form or configuration in which they are finally finished. Thus, it will be within the skills of those practicing this invention to realize that embodiments of this invention may be in the general shape of cylinders, or rectangular, square or other solids, or other shapes appropriate to their intended uses, and may comprise self-contained units, or cartridges to be inserted into separate containment housings, or other known per se forms of structures, with or without outer, interim protective covers. As such, devices embodying this invention may be produced in a wide variety of sizes and shapes, utilizing many different materials, methods, techniques and types of equipment.

Accordingly, it is to be understood that the embodiments of this invention herein described, illustrated and claimed, are by way of illustration and not of limitation, and that a wide variety of other embodiments may be made without departing from the spirit or scope of this invention or of the teachings and claims here presented.

I claim:

1. A separation device of desired physical, chemical and thermal characteristics and stability for separating selected substances from a stream of fluid flowing therethrough, comprising
    continuums made from separation material through which fluid may pass while selected substances are disassociated from said stream of fluid by said separation material,
    said continuums being arranged into superimposed planar arrays, in each of which arrays said continuums
        are substantially parallel to each other, with spacings between them at selected locations that form intra-array distribution passageways, and
        are oriented angularly with respect to, and where they cross them, are in close contact with, substantially all of the continuums that they cross in each next adjacent such array,
    and cross-array distribution channels extending through said arrays, said channels being formed collectively by cross-overs of said spacings in adjacent arrays, some of said channels being adapted for use as ingress passageways for introducing fluid into said device, and others of said channels being adapted for use as egress passageways for removing fluid that has been treated by said device from said device,
    the contents of said cross-array channels being variously selected from the group consisting of
        (a) void volume,
        (b) separation media through which fluid may pass while selected substances are disassociated from said fluid by said separation material, and
        (c) blocking material which is substantially impervious to the passage of said fluid therethrough,
    to creak flow paths through said device via which passes all fluid which traverses said device, all of which flow paths include separation material that has been used in constructing said device.

2. The device described in claim 1 wherein said continuums are textile yarns.

3. The device described in claim 1 wherein said continuums are strips of felted materials.

4. The device described in claim 1 wherein each of said arrays is substantially flat planar in configuration.

5. The device described in claim 4 wherein, in cross-section across their continuums, there are positionally corresponding spacings between the constituent continuums of arrays once removed from each other which are at least partially in registration with each other.

6. The device described in claim 5 wherein said spacings are substantially entirely in registration with the corresponding spacings in sequentially every other one among said other arrays.

7. The device described in claim 6 wherein the continuums in each array are oriented substantially at right angles with respect to those in each next adjacent array.

8. The device described in claim 5 wherein the continuums in each array are oriented substantially at right angles with respect to those in each next adjacent array.

9. The device described in claim 8 said continuums comprising each array are arranged into parallel groupings of more than one closely spaced apart continuums, and such groupings are spaced apart from each other.

10. The device described in claim 9 wherein said groupings of continuums are pairs.

11. The device described in claim 8 wherein said continuums are textile yarns.

12. The device described in claim 9 wherein said continuums are textile yarns.

13. The device described in claim 11 wherein the means by which said some of said cross-array passageways are adapted for use as ingress passageways and by which said others of said cross-array passageways are adapted for use as egress passageways is by one of the ends of each of said passageways being blocked to the passage of fluid therethrough.

14. The device described in claim 13 wherein the means of effectuating said blocking of one end of each of said adapted passageways is a plate which abuts the surface of said device at which said passageway terminates.

15. The device described in claim 14 wherein those among said cross-array passageways that have been adapted for use as ingress passageways and as egress passageways have been so adapted by having one end of each passageway blocked by one of said plates, and the other end accessible via apertures in the other of said plates, with all of said blocking of those among them which are adapted for use as egress channels being created by one of said plates and all of those as egress channels by the other of said plates.

16. A separation device of desired physical, chemical and thermal characteristics and stability for separating selected substances from a stream of fluid flowing therethrough, comprising:
continuums made from separation material through which fluid may pass while selected substances are disassociated from said stream of fluid by said separation material,
said continuums being arranged into superimposed planar arrays, in each of which arrays said continuums
are substantially parallel to each other, with spacings between them at selected locations that form intra-array distribution passageways, and
are oriented angularly with respect to, and, where they cross them, are in close contact with, substantially all of the continuums that they cross in each next adjacent such array,
and cross-array distribution channels extending through said arrays, said channels being formed collectively by cross-overs of said spacings in adjacent arrays, some of said channels being adapted for use as ingress passageways for introducing fluid into said device, and others of said channels being adapted for use as egress passageways for removing fluid that has been treated by said device from said device,
the contents of said cross-array channels being in at least two predetermined patterns, the contents of the channels in each of which patterns has been selected from a different one among the group consisting of
(a) void volume,
(b) separation media through which fluid may pass while selected substances are disassociated from said fluid by said separation material, and
(c) blocking material which is substantially impervious to the passage of said fluid therethrough,
to creak flow paths through said device via which passes all fluid which traverses said device, all of which flow paths include separation material through which all fluid traversing said device must pass.

17. The device described in claim 16 wherein said continuums are textile yarns.

18. The device described in claim 16 wherein said continuums are strips of felted materials.

19. The device described in claim 16 wherein each of said arrays is substantially flat planar in configuration.

20. The device described in claim 19 wherein, in cross-section across their continuums, there are positionally corresponding spacings between the constituent continuums of arrays once removed from each other which are at least partially in registration with each other.

21. The device described in claim 20 wherein said spacings are substantially entirely in registration with the corresponding spacings in sequentially every other one among said other arrays.

22. The device described in claim 21 wherein the continuums in each array are oriented substantially at right angles with respect to those in each next adjacent array.

23. The device described in claim 20 wherein the continuums in each array are oriented substantially at right angles with respect to those in each next adjacent array.

24. The device described in claim 23 wherein said continuums comprising each array are arranged into parallel groupings of more than one closely spaced apart continuums, and such groupings are spaced apart from each other.

25. The device described in claim 24 wherein said groupings of continuums are pairs.

26. The device described in claim 23 wherein said continuums are textile yarns.

27. The device described in claim 24 wherein said continuums are textile yarns.

28. The device described in claim 26 wherein the means by which said some of said cross-array passageways are adapted for use as ingress passageways and by which said others of said cross-array passageways are adapted for use as egress passageways is by one of the ends of each of said passageways being blocked to the passage of fluid therethrough.

29. The device described in claim 28 wherein the means of effectuating said blocking of one end of each of said adapted passageways is a plate which abuts the surface of said device at which said passageway terminates.

30. The device described in claim 29 those among said cross-array passageways that have been adapted for use as ingress passageways and as egress passageways have been so adapted by having one end of each passageway blocked by one of said plates, and the other end accessible via apertures in the other of said plates, with all of said blocking of those among them which are adapted for use as egress channels being created by one of said plates and all of those as egress channels by the other of said plates.

31. A filter device for the removing particles from a stream of fluid by which they are being borne comprising filtration material which is made from fluid transmissive, particle retentive material that is tolerant of the physical, chemical and thermal environment to which it is to be exposed during the filtering process, and blocking material that is tolerant of the physical, chemical and thermal environment to which it is to be exposed during the filtering process, and through which significant amounts of fluid cannot pass.

wherein filtration continuums made from such filtration material are arranged into a lamination of superimposed, substantially parallel planar arrays which are oriented substantially parallel to each other and the constituent filtration continuums of which within each such array are oriented substantially parallel to each other, the axes of the filtration continuums in each array are oriented angularly with respect to those of each other next adjacent array, each filtration continuum in each array is in close contact with substantially all of the filtration continuums that it crosses that are in each next adjacent array, where they cross, the filtration continuums in each of said arrays are closely spaced-apart at selected locations to form intra-array distribution channels therebetween which, in turn, are at least partially in registration with corresponding such channels so formed in the arrays once removed therefrom, and, collectively with such channels in those arrays which are immediately next adjacent, form cross-array channels extending through said arrays collectively, selected among said cross-array channels are adapted for use as ingress paths for introducing the fluid to be treated into said filter and others among said channels are adapted for use as egress paths for removing filtered fluid from said filter, and the contents of said ross array channels are selected from the group consisting of (1) void volume, (2) such filtration material, and (3) such blocking material, to create flow paths via which substantially all of the fluid transverses said filter only after having passed through filtration material used in constructing said filter.

32. The device described in claim 31 wherein said continuums are textile yarns.

33. The device described in claim 32 wherein each of said arrays is substantially flat planar in configuration.

34. The device described in claim 33 wherein said spacings are substantially entirely in registration with the corresponding spacings in sequentially every other one among said other arrays.

35. The device described in claim 33 wherein the continuums in each array are oriented substantially at right angles with respect to those in each next adjacent array.

36. The device described in claim 34 wherein said continuums in each array are oriented substantially at right angles with respect to those in each next adjacent array.

37. The device described in claim 35 wherein said continuums comprising each array are arranged into parallel groupings of more than one closely spaced apart continuums, and such groupings are spaced apart from each other, 38. The device described in claim 37 wherein said groupings of continuums are pairs.

39. The device described in claim 36 wherein the means by which said some of said cross-array passageways are adapted for use as ingress passageways and by which said others of said cross-array passageways are adapted for use as egress passageways is by one of the ends of each of said passageways being blocked to the passage of fluid therethrough.

40. The device described in claim 39 wherein the means of effectuating said blocking of one end of each of said adapted passageways is a plate which abuts the surface of said device at which said passageway terminates.

41. The device described in claim 40 wherein those among said cross-array passageways that have been adapted for use as ingress passageways and as egress passageways have been so adapted by having one end of each passageway blocked by one of said plates, and the other end accessible via apertures in the other of said plates, with all of said blocking of those among them which are adapted for use as egress channels being created by one of said plates and all of those as egress channels by the other of said plates.

* * * * *

UNITED STATES PATENT AND TRADEMARK OFFICE
CERTIFICATE OF CORRECTION

PATENT NO. : 5,141,641
DATED : August 25, 1992
INVENTOR(S) : Keith E. Burgess

It is certified that error appears in the above—identified patent and that said Letters Patent is hereby corrected as shown below:

In Column 16 at line 61; change "creak" to ---create---.

In Column 18 at line 21; change "creak" to ---create---.

Signed and Sealed this

Fourth Day of May, 1993

Attest:

MICHAEL K. KIRK

Attesting Officer

Acting Commissioner of Patents and Trademarks